United States Patent [19]

Patel et al.

[11] Patent Number: 5,585,407

[45] Date of Patent: Dec. 17, 1996

[54] WATER-BASED COATABLE COMPOSITIONS COMPRISING REACTION PRODUCTS OF ACRYLIC EMULSION POLYMERS WITH ORGANOALKOXYSILANES

[75] Inventors: Vinu Patel, Oakdale; Fidelis C. Onwumere, Woodbury, both of Minn.

[73] Assignee: Minnesota Mining and Manufacturing Company, St. Paul, Minn.

[21] Appl. No.: 502,166

[22] Filed: Jul. 13, 1995

[51] Int. Cl.$^6$ .................................................. C09D 5/14
[52] U.S. Cl. ........................................ 514/772.6; 424/409
[58] Field of Search .................... 424/409; 514/772.6

[56] References Cited

U.S. PATENT DOCUMENTS

| | | | |
|---|---|---|---|
| 3,615,739 | 10/1971 | Varsanyi et al. | 106/10 |
| 3,666,698 | 5/1972 | Harris et al. | 528/295.5 |
| 3,837,875 | 9/1974 | Murphy | 106/264 |
| 3,976,501 | 8/1976 | Blue | 134/10 |
| 4,008,351 | 2/1977 | Inoue et al. | 428/411 |
| 4,500,337 | 2/1983 | Young et al. | 71/67 |
| 4,500,339 | 2/1985 | Young et al. | 71/67 |
| 4,601,954 | 7/1986 | Coleman | 428/522 |
| 4,622,360 | 11/1986 | Gomi et al. | 524/507 |
| 4,818,536 | 4/1989 | Meyers et al. | 424/409 |
| 5,061,485 | 10/1991 | Oakes et al. | 514/643 |
| 5,089,205 | 2/1992 | Huang et al. | 264/305 |
| 5,118,534 | 6/1992 | Relenyi et al. | 427/384 |
| 5,154,920 | 10/1992 | Flesher et al. | 514/643 |
| 5,234,974 | 8/1993 | Calhoun et al. | 523/169 |
| 5,319,049 | 6/1994 | Yoshioka et al. | 528/10 |

FOREIGN PATENT DOCUMENTS

0366071A2  5/1990  European Pat. Off. .

OTHER PUBLICATIONS

OrganoSilicon Product Information Union Carbide Organofunctional Silanes Products and Applications, by Union Carbide dated 1991, 1992.

*Primary Examiner*—Peter F. Kulkosky
*Attorney, Agent, or Firm*—Gary L. Griswold; Walter N. Kirn; Daniel R. Pastirik

[57] ABSTRACT

Water-based coatable compositions for application to a substrate to inhibit the growth of microbes for extended periods of time, durable removable biocidal polymeric coatings resulting from such coatable compositions, a method of protecting a substrate from the growth of microbes and substrates resistant to such growth are described. The coatable compositions comprise an acrylate emulsion polymer comprising the reaction product of one or more acrylate or methacrylate monomers and one or more carboxylic acid monomers, an organoalkoxysilane, an effective amount of biocide, plasticizer and water. The coatable composition may be applied to the surface of a substrate and allowed to dry to provide durable adherent polymeric coatings which slowly release biocide to the surrounding surface for extended periods of time. The polymeric coatings may be removed from the substrate by alkaline washing, for example, but otherwise will remain on the substrate even after exposure to significant and continuous warm water rinsing.

19 Claims, No Drawings

WATER-BASED COATABLE COMPOSITIONS COMPRISING REACTION PRODUCTS OF ACRYLIC EMULSION POLYMERS WITH ORGANOALKOXYSILANES

The present invention relates to water-based coatable compositions that can be applied to a substrate to inhibit the growth of microbes for extended periods of time, to durable removable biocidal polymeric coatings resulting from such coatable compositions, to a method of protecting a substrate from the growth of microbes and to substrates resistant to such growth.

BACKGROUND OF THE INVENTION

The control of mold, mildew, algae, fungi and other microbes or microorganisms in bathrooms, shower stalls, and other moist or humid environments has long been a matter of concern. Biocides such as mildewcide, antimicrobial, antiseptic, disinfectant, sanitizer, germicide, algaecide, slimicide, antifouling agent, or preservative are typically employed to remove microbes from an area and prevent their recurrence. The use of biocides in the control or prevention of microbial growth requires effective contact between the biocide and the microbe. One problem in achieving effective and long lasting control of microbial growth has been the ease by which commercially available biocidal compositions can be washed from most substrates by the application of moderate volumes of water. In moist environments such as a home bathroom, for example, the surfaces of walls and floors around tubs, shower stalls, and sinks often experience daily exposure to significant volumes of water. This daily exposure to water washes conventional biocides from the surfaces to which they are applied, requiring frequent reapplication to retain a desired level of antimicrobial action. Consequently, some effort has been devoted to the search for a biocide containing material that will remain on a substrate for an extended period of time to make frequent reapplication unnecessary.

Different compositions have been proposed as effective in achieving the controlled release of biocides. Adherent controlled release microbiocides are described in the patent literature including the patents to Young et al., U.S. Pat. Nos. 4,500,337 and 4,500,339. These patents describe compositions containing microbiocide, hydrolyzable silanes or organopolysiloxanes, hydrolyzable organic titanium compounds and hydroxyl containing organopolysiloxanes or carbinol containing polymers. The Young et al. patents require that the polymers employed in the described compositions contain carbinol groups to promote cross-linking with the silanes in the composition. The compositions proposed by Young et al., however, are solvent based (e.g.. not water-based) formulations. Based on the disclosed chemistry, these compositions cannot be easily removed after being applied to a substrate. Consequently, they are not well suited for use by individuals in home bathroom environments, for example.

Other approaches include the use of a water soluble polymers such as polyester resin containing phenylindane dicarboxylic acid as well as polymeric compositions that contain a balance of hydrophilic monomers such as acrylates and modifying monomers such as cycloalkyl esters and aromatic esters. Other water-based coatings are known which may also contain a biocidal component. Known water-based coatings, however, have exhibited very poor adhesion to smooth non-porous substrates such as glass, ceramic tile, fiberglass and the like. In order to improve the adherence of such coatings, additional steps are normally taken in their application to substrates such as heat curing of the polymer or the prior application of an adhesion promoting primer to the substrate. Alternatively, it is known that the texture of the substrate surface can be partially abraded to create surface irregularities to which the polymer will more firmly adhere. In the absence of these additional measures, water-based compositions are easily removed from the substrate by warm water washing or even by exposure to conditions of high humidity.

In light of the above, the art has generally failed to provide effective water-based biocidal compositions which will readily from durable coatings when applied to smooth nonporous surfaces and which are capable of withstanding exposure to warm water rinsing for extended periods of time while releasing biocidal agents to the surrounding surface in a controlled manner. Hence, a substantial need exists for such water-based compositions for application onto smooth substrates such as tiled walls, for example. A need exists for such coatable compositions to form durable adherent coatings capable of remaining on the substrate without the use of adhesion promoting primers or other surface modifying treatments and which will slowly release biocide to the surrounding substrate. It is desirable to provide such coatable compositions capable of forming adherent but removable coatings (e.g., by alkaline washing) that will withstand substantial exposure to significant, and even continuous, warm water rinsing while remaining biocidally effective for an extended period of time.

SUMMARY OF THE INVENTION

The present invention provides water-based coatable compositions that can be applied to a suitable substrate to provide long lasting protection from the growth of any of a variety of microbes such as mold, mildew, algae, fungi, and the like. The compositions of the invention may be applied as a liquid over a suitable substrate (e.g., ceramic tile) and, upon drying, will form protective and adherent polymeric coatings which slowly release biocide to the surrounding substrate for extended periods of time. The polymeric coatings of the invention may be easily removed from the substrate (e.g., by alkaline washing) but are capable of remaining on the substrate even after exposure to significant and even continuous warm water rinsing for prolonged periods of time. Consequently, the biocidal compositions of the invention are well suited for home use in moist environments such as in bathrooms and especially on tiled walls around shower stalls, bath tubs and the like. The polymeric coatings are durable, glossy films which protect the substrate without detracting from its appearance.

In one aspect, the invention provides a coatable composition suitable for application to a substrate to prevent the growth of microbes thereon, the composition comprising:

an acrylate emulsion polymer comprising the reaction product of one or more acrylate or methacrylate monomers and one or more acrylic or methacrylic acid monomers, said acrylate emulsion polymer including a plurality of reactive carboxyl groups;

an organoalkoxysilane of the general formula
(A)N(R$_4$)(R$_4$)
wherein
A is [(OR$_1$)Si(R$_2$)(R$_3$) C$_n$H$_{2n-1}$],
n is an integer from 1 to 6,
R$_1$ can be H or C$_1$–C$_6$ alkyl (straight, branched or cyclic), $R_2$ and $R_3$ independently are —OH, $OR_1$, or $C_1$–$C_6$ alkyl (straight, branched or cyclic), $R_4$ and $R_5$ independently are A, H, $C_1$–$C_6$ alkyl (straight, branched or cyclic), and $C_1$–$C_6$ aminoalkyl (straight, branched or cyclic);

an effective amount of biocide; and water.

In the silane, preferably $R_1$ is $CH_3$ or $C_2H_5$. $R_2$ and $R_3$ can be the same or different but preferably are the same and more preferably are $OR_1$. $R_4$ and $R_5$ can be the same or different and preferably are H, $CH_3$ or $C_2H_5$. A most preferred silane is 3-aminopropyltrimethoxy silane. In addition to the above listed components, the coatable compositions of the invention can optionally include plasticizer, coating aids, perfumes, colorants (e.g., dyes), waxes and metallic complexing agents. The coatable compositions may be applied to smooth substrates such as ceramic tile, grout, painted sheetrock and the like, and dried at ambient conditions to provide polymeric coatings in the form of durable films which release biocide in a controlled manner. The polymeric coatings protect the substrate from mildew and other microbes for extended periods of time and which can withstand exposure to humid or wet conditions such as warm running water (e.g., about 38° C.) and even continuous warm water rinsing.

In describing the aspects of the present invention, certain terms will be understood to have a certain meaning, as defined herein. "Coatable composition" refers to an aqueous emulsion or solution comprising components as further described herein which can be applied over any of a variety of substrates and which, upon drying, forms a durable, water-resistant polymeric coating. "Polymeric coating" refers to a durable adherent film-like coating resulting from drying the coatable composition. "Biocide" refers to any antimicrobial agent including without limitation mildewcide, antimicrobial, antiseptic, disinfectant, sanitizer, germicide, algaecide, slimicide, antifouling agent, and preservative. An "effective amount" of biocide refers to an amount of biocide effective in preventing the visible growth of microbe colonies. The term "substrate" refers to a surface to which the coatable composition may be applied. "Controlled release" refers to the gradual release of biocide from the polymeric coating to the surrounding substrate to provide effective antimicrobial activity for a longer period of time than for the same biocide applied to the substrate without a polymeric coating. "Ambient conditions" refers to existing or prevailing temperature and humidity. In referring to the drying of the coatable composition at ambient conditions, it will be understood that drying is accomplished without the use of heaters, air flow control devices (e.g., fans) or other devices. "Alkyl" refers inclusively to straight chain, branched chain and cyclic alkyl moieties. Likewise, "aminoalkyl" refers inclusively to straight chain, branched chain and cyclic aminoalkyl moieties.

In another aspect, the invention provides an adherent, durable coating capable of bonding to a substrate to provide protection from the growth of microbes over an extended period of time, the coating comprising:

the reaction product of an acrylate emulsion polymer and an organoalkoxysilane, said acrylate emulsion polymer including a plurality of reactive carboxyl groups and comprising the reaction product of one or more acrylate or methacrylate monomers and one or more acrylic or methacrylic acid monomers, said organoalkoxysilane represented by the general formula $(A)N(R_4)(R_5)$ wherein A is $[(OR_1)Si(R_2)(R_3)C_nH_{2n-1}]$, n is an integer from 1 to 6, $R_1$ can be H or $C_1$–$C_6$ alkyl (straight, branched or cyclic), $R_2$ and $R_3$ independently are —OH, $OR_1$, or $C_1$–$C_6$ alkyl (straight, branched or cyclic), $R_4$ and $R_5$ independently are A, H, $C_1$–$C_6$ alkyl (straight, branched or cyclic), and $C_1$–$C_6$ aminoalkyl (straight, branched or cyclic); and biocide.

In still another aspect, the invention provides a process for protecting a substrate from the growth of microbes over an extended period of time, the process comprising:

applying a coatable composition to the substrate, said composition comprising (a) an acrylate emulsion polymer comprising the reaction product of one or more acrylate or methacrylate monomers and one or more acrylic or methacrylic acid monomers, said acrylate emulsion polymer including a plurality of reactive carboxyl groups, (b) an organoalkoxysilane of the general formula $(A)N(R_4)(R_5)$ wherein A is $[(OR_1)Si(R_2)(R_3) C_nH_{2n-1}]$, n is an integer from 1 to 6, $R_1$ can be H or $C_1$–$C_6$ alkyl (straight, branched or cyclic), $R_2$ and $R_3$ independently are —OH, $OR_1$, or $C_1$–$C_6$ alkyl (straight, branched or cyclic), $R_4$ and $R_5$ independently are A, H, $C_1$–$C_6$ alkyl (straight, branched or cyclic), and $C_1$–$C_6$ aminoalkyl (straight, branched or cyclic);

(c) biocide; and (d) water.

drying said composition to form a durable coating adhered to said substrate.

In still another aspect, the invention comprises substrates treated with the coatable compositions of the invention.

Those skilled in the art will more fully understand the details of the present invention upon a consideration of the remainder of the disclosure including the detailed description of the preferred embodiment as well as the appended claims.

DETAILED DESCRIPTION OF THE PREFERRED EMBODIMENT

The preferred embodiment of the invention is described below in detail with the components of the coatable compositions described individually, as indicated.

ACRYLATE POLYMER

As mentioned, the coatable compositions of the invention include an acrylate emulsion polymer. Preferably the acrylate component is an acrylate emulsion polymer capable, either by itself or in concert with other components in the composition, of imparting excellent film forming properties to the composition so that the application of the composition to a substrate, after drying, results in a uniform, durable protective polymeric coating (e.g., a film) which does not adversely affect the physical appearance of the substrate to which it is applied and which allows for the controlled release of biocide to the surrounding substrate to prevent the visible growth of microbes such as mildew.

Preferred acrylate polymers are those composed of one or more copolymers of ethylenically unsaturated comonomers. The monomers useful in the compositions of the invention comprise one or more ethylenically unsaturated polar or nonpolar, nonionizing monomers and at least one ethylenically unsaturated carboxylic acid. The monomers can include more than one ethylenically unsaturated sites and the suitable carboxylic acids preferably include one or more carboxyl groups. Suitable ethylenically unsaturated acids include acrylic, methacrylic, butenoic, maleic, fumaric, itaconic, and cinnamic acids as well as dimer acids such as acrylic and methacrylic dimer acids and combinations of the foregoing. Ethylenically unsaturated polar or nonpolar, nonionizing monomers include ethylenically unsaturated esters, ethylenically unsaturated nitriles, ethylenically unsaturated alcohols, aryl vinyl compounds and arylalkyl vinyl compounds. Based on commercial availability, the acrylate polymers are preferably copolymers of acrylic acid esters and methacrylic acid esters, such as $C_1$–$C_6$ alkyl acrylates or methacrylates, in combination with acrylic or methacrylic acid, cyanoacrylates and methacrylates (e.g., acrylonitrile) and other known acrylic, vinyl and diene monomers. The preferred acrylate polymers include an aliphatic backbone which is substantially free of incorporated oxygen and which includes a plurality of pendant carboxyl groups capable of forming a salt with an amine functional compound such as the silanes, described in detail below.

The acrylate polymer component can optionally contain one or more metal salt complexing agents effective as crosslinking agents. When present such complexing agents bond with the pendant carboxyl groups on the acrylate polymers to form a crosslinked polymer which is more water resistant than a comparable acrylate polymer which is not crosslinked. Suitable metal salt complexing agents include those containing zinc such as zinc ammonium carbonate, for example. Other useful complexing agents include known salts of various metals including zirconium, calcium, magnesium and the transition metals, for example. The transition metal salts, however, are considered somewhat less preferred because of their known tendency to impart color to the substrate to which they are applied. Exemplary complexing agents include polyvalent metal complexes such as ammonium zinc carbonate, ammonium calcium ethylenediamine carbonate, ammonium zinc acetate, ammonium zinc acrylate, ammonium zinc maleate, ammonium zinc amino acetate and ammonium calcium aniline and combinations of the foregoing.

Commercially available carboxylated acrylate polymer emulsions may be used singly or in combination with one another in the coatable compositions of the invention. Suitable commercial emulsions include those with a metal complexing agent as described above as well as those without added metal complexing agents. Suitable metal free emulsions include commercially available materials such as those available under the trade designations "Rhoplex" NT 2624 (available from Rohm and Haas Company of Philadelphia, Pa.); "Esi-Cryl" 20/20 (available from Emulsion Systems, Valley Stream, N.Y.); and "Syntran" 1905 (available from Interpolymer of Canton, Mass.). Commercial emulsions which include a zinc complexing agent suitable for inclusion in the compositions of the invention include those available under the trade designations "Duraplus" I and "Rhoplex" B-825 (both from Rohm and Haas), "Conlex" V (Morton International of Chicago, Ill.) and "Esi-Cryl" 2000 (Emulsion Systems). Other metal containing and metal free acrylate emulsions may be used, as known by those skilled in the art.

The acrylate polymer component is preferably prepared as an emulsion and is present in the coatable composition of the invention at a concentration ranging from about 3 to 25 wt-%, and more preferably from about 6 to 20 wt-% based on total weight of the composition. The acrylate polymer is important in the compositions of the invention as the film forming component. Although the invention is not to be limited to the aforementioned concentration ranges, coatable compositions containing less than 3 wt-% of the acrylate polymer may be unable to form an acceptable polymeric coating or a biocidally effective coating. On the other hand, coatable compositions containing more than 25 wt-% acrylate polymer will generally be undesirably viscous and, consequently, difficult to apply uniformly to a suitable substrate. Nonuniform application of the coatable composition to the substrate can result in uneven and unattractive polymeric coatings. The preferred coatable compositions of the invention are those which can be applied to the smooth surface of a substrate (e.g., ceramic tile) and dried, preferably at ambient condition, to provide a polymeric coating coextensive with the surface of the substrate and forming a durable film which covers the substrate's surface and providing a controlled release of biocide to the substrate, as described herein.

ORGANOSILANE

An organosilane (hereinafter "silane") is included in the coatable compositions of the invention. The preferred silanes are organoalkoxysilanes, especially those capable of providing a polymeric coating having excellent adherent properties when applied to smooth substrates such as ceramic tile, for example. The preferred silanes are those which will form adherent polymeric coatings resistant to warm water rinsing, are water soluble or water-dispersible and contain an amino group capable of forming a salt with the carboxyl groups of the acrylate polymer. Preferably, the silanes are water soluble silanes represented by the formula:

(A)N($R_4$)($R_5$)

wherein,

A is [(O$R_1$)Si($R_2$)$R_3$)$C_nH_{2n-1}$], n is an integer from 1 to 6, $R_1$ can be H or $C_1$–$C_6$ alkyl (straight, branched or cyclic), and preferably is $CH_3$ or $C_2H_5$, $R_2$ and $R_3$ independently are —OH, O$R_1$, or $C_1$–$C_6$ alkyl (straight, branched or cyclic), and preferably are the same as O$R_1$, $R_4$ and $R_5$ independently are A, H, $C_1$–$C_6$ alkyl (straight, branched or cyclic), and $C_1$–$C_6$ aminoalkyl (straight, branched or cyclic), and preferably are H, $CH_3$ or $C_2H_5$.

In the preferred silanes, when $R_4$ and/or $R_5$ are aminoalkyl, the amine functional group of the $R_4$ and/or $R_5$ moiety may be partially or completely substituted with additional alkyl or aminoalkyl groups which, in turn, can also include additional silane functionality such as N-beta-(Aminoethyl)-gamma-aminopropyltrimethoxysilane, for example. In addition to the above described silanes, other silicon containing organoamino compounds may be suitable, as known by those skilled in the art.

Commercially available silanes are suitable for use in the invention, such as those available from OSi Specialties, Inc. of Danbury, Conn. and include gamma-aminopropyltriethoxysilane (available under the designation "A-1100"), gamma-aminopropyltrimethoxysilane (available under the designation "A-1110"), N-beta-(Aminoethyl)-gamma-aminopropyltrimethoxysilane (available under the designation "A-1120"), triaminofunctional silane (available under the designation "A-1130"), and Bis-(gamma-trimethoxysilylpropyl) amine (available under the designation "A-1170"). A most preferred silane is gamma-aminopropyltrimethoxysilane.

The silane is typically present in the coatable compositions in amounts ranging from about 0.25 to about 3 wt-%, and preferably about 0.25 to about 1 wt-%, based on the total weight of the composition. Without being bound to any particular theory, it is generally believed that the amine portion of the silane forms a salt with the carboxyl groups in the acrylic emulsion polymer described above. In the presence of excess water, the silane will normally hydrolyze to form a silanol, the stability of which is dependent on its concentration in the mixture. When the silane concentration in the composition exceeds about 3%, the concentration of the resulting silanol may be too high and gelation may occur from the condensation of silanol to polysiloxane, thus rendering the composition uncoatable and, therefore, undesirable. When the concentration of the silane is less than 0.25%, the amount of silane present in the composition may be insufficient to form a polymeric coating having the adherent properties and the warm water resistance desired.

The inclusion of a silane within the compositions of the invention is important because it is believed that when the coatable composition is applied to a suitable substrate and allowed to dry, the silanol reacts with available hydroxyl groups on the surface of the substrate. Upon drying, the reaction between the composition and the surface of the substrate results in the enhanced adhesion of the polymeric coating to the substrate. As should be appreciated, the compositions of the invention will form polymeric coatings which adhere to certain substrates, especially those having hydroxyl groups disposed at the surface of the substrate and available for bonding with the silanol groups of the hydrolyzed silane. Suitable substrates include without limitation siliceous substrates such as ceramic tile or other ceramic surfaces, grout, painted sheetrock and other substrates with surfaces having available hydroxyl groups, as known by those skilled in the art.

BIOCIDE

As mentioned, the coatable compositions of the invention will include an effective amount of biocide to prevent the growth of visible microbe colonies. The invention is not to be limited to the selection of any particular biocide, and any known water-soluble or water-dispersible biocide may be included in the compositions of the invention such as mildewcides, antimicrobials, antiseptics, disinfectants, sanitizers, germicides, algicides, antifouling agents, preservatives, combinations of the foregoing and the like. It is intended within the broad teachings of the invention that the biocide will be selected as needed to protect a particular substrate against a particular type of microbial growth under conditions of humidity or exposure to varying degrees of moisture. Moreover, the biocide included within the compositions of the invention can comprise one or more biocidally effective substances. The selected biocide or combination of biocides will be compatible with the other ingredients in the coatable composition, and preferably is one which is effective against common mildew colonies such as those normally found in moist bathroom environments, for example. The selection of a suitable biocide for inclusion within the compositions of the invention is believed to be within the skill of those practicing in the field. Notwithstanding the foregoing, biocides comprising cationic quaternary ammonium compounds are not preferred because such compounds typically are not stable in the presence of anionic acrylate polymer emulsion.

With the requirement that the biocide is chemically compatible with the other components in the composition, suitable classes of biocides include organosulfur compounds such as sulfones and thiocyanates; isothiazolones; phenols and substituted phenols; diazines; triazines, organotin compounds; amides such as 2,2-dibromo-3-nitrilopropionamide and iodobenzanilide; carbamates including thiocarbamates, benzimidazolyl carbamates and dithiocarbamates; hydantoins including dimethylhydantoins; organohalogens; carbinols such as dichlorophenyl trichloroethanol; organophosphates; ureas including benzoyl ureas such as difluoro benzoyl chlorophenylurea; pyrethrinoids; quinones; dicarboximides; guanidines such as dodecyl guanidine acetate; triazoles; thiadiazoles; and metallic monoethyl phosphates, as well as effective combinations of any of the foregoing compounds.

Most preferred are biocidal compositions include those known to be effective in preventing the visible growth of mildew colonies, including, for example, 3-iodo-2-propynyl butylcarbamate, 2-(4-thiazolyl)benzimidazole, diiodomethyl-p-tolylsulfone, tetrachloroisophthalonitrile, the zinc complex of 2-pyridinethiol-1-oxide (including salts thereof) as well as combinations of the foregoing. The biocide may be present within the coatable compositions of the invention at a concentration ranging from about 0.5 to 4.0 wt-%, and preferably ranging from about 1.0 to 2.0 wt-%. Of course, the invention is not to be limited to the foregoing concentration ranges. The concentration of biocide can be adjusted as needed to maintain a desired level of effectiveness under varying conditions of expected use such as differing humidity levels temperature conditions and the like. Additionally, the chemical nature of the chosen biocide may influence the desired concentration of biocide, as known by those skilled in the art.

OTHER COMPONENTS

Depending on the particular acrylate emulsion used, the coatable composition of the invention may contain a suitable plasticizer to aid in film formation after the composition has been applied to a substrate, and thereafter prevent the resulting polymeric coating from becoming brittle and easily chipping or breaking free from the substrate. When present, the plasticizer will generally be at a concentration within the range from about 0.2 to about 2.5 wt-%. The inclusion of plasticizer within the coatable composition is within the skill of those practicing in the field, and the actual concentration of plasticizer can vary outside of the above concentrations. Useful classes of plasticizers include phosphates and phthalate esters, with tributoxyethyl phosphate being the preferred plasticizer such as that available under the trade designation "KP-140" from FMC Corporation, of Philadelphia, Pa. Those skilled in the art will appreciate that the invention does not require a plasticizer and is not limited to the inclusion of any particular plasticizer over another.

Coalescent solvents (e.g., "cosolvents") are preferably added to assist in proper film formation. Suitable cosolvents include those which will evaporate slowly, are water miscible and allow the polymer micelles to relax during a dry down, thereby allowing the polymeric coating to form as a smooth continuous film on the surface of the substrate to which the coatable composition has been applied. Such coalescent solvents preferably make up between about 1 and about 10 wt-% of the coatable compositions of the invention. Examples of suitable cosolvents include $C_1$ to $C_4$ monoalkyl ethers of mono-, di-, or tri- ethylene or propylene glycol ethers. Because of commercial availability and considerations of cost, preferred solvents include dipropylene glycol methyl ether available under the trade designation "ARCOSOIVE DM" from ARCO Chemical Corporation and tripropylene glycol methyl ether commercially available under the trade designation "ARCOSOLVE DM", also from ARCO. However, other known solvents may be used.

An additional optional but preferred ingredient in the coatable compositions is a styrene butadiene latex, preferably carboxylated, for enhanced adhesion to certain surfaces such as stone surfaces, for example. Preferably, the latex is added as a component in the acrylate emulsion polymer described above. One suitable latex is that available under the trade designation "Unocal 5550" from Unocal Corporation, of Schaumburg, Ill. When present, the latex should be at a weight percentage of up to about 10% based on the weight of the acrylate emulsion. The coatable composition may also contain additional optional ingredients such as waxes, surfactants, preservatives, antifoaming agents, perfumes, dyes, leveling agents and the like. Such optional ingredients may be present in amounts effective to produce a polymeric coating having desired properties, as known by those skilled in the art. These optional ingredients may be present in the composition in amounts up to about 10% by weight based on the weight of the coatable composition.

BLENDING OF COMPONENTS

Preferably, the coatable compositions are formulated in an aqueous medium of primarily water (e.g., deionized water) but may also include other compatible solvents such as volatile organic solvents miscible with water, such as acetone, methanol, ethanol, ethers, and the like. In preparing the coatable compositions of the invention, the components are added to the aqueous medium and mixed thoroughly. Typically, the plasticizer and coalescing aid are first added to water (e.g., deionized water), followed by acrylate polymer, resins and waxes to form a pre-mix. The silane is separately dissolved or dispersed in water and the acrylate polymer pre-mix is added to the silane followed by the biocide. Preferably, the blending of the components is performed with constant mixing, and most preferably, the composition is thoroughly mixed under constant stirring or mixing for 5 to 10 minutes between the addition of each component.

If desired, commercial floor finish compositions can be used in the formulation of the coatable compositions of the invention. Suitable floor finish compositions are those which include acrylate polymer, plasticizer, waxes and other optional ingredients in an aqueous system. If such a commercially available floor finish composition is used, the coatable composition is prepared by first adding the silane to water, then adding the floor finish to the water/silane mixture and then adding the biocide. Again, the aforementioned conditions of constant mixing are preferred during the formulation of the coatable composition. Suitable commercially available floor finish compositions include the floor sealer/finish available under the trade designation "Cornerstone" from Minnesota Mining and Manufacturing Company of St. Paul, Minn.

As mentioned above, the coatable composition may be applied to any surface capable of reacting with the silane component of the coating composition. Appropriate substrates include those having hydroxyl groups or other reactive groups at the surface of the substrate such as ceramic tile, grout, painted sheetrock, marble, glass, fiberglass, vinyl tiles, polished chrome, polished brass and the like. Any suitable mode of application may be used to apply the coatable composition to the substrate such as by trigger spray or foam applicator followed by wiping with a cloth or paper towel, for example, or by painting the composition onto the substrate with a brush or roller.

To obtain the best water resistance and adhesion properties, the substrate is first cleaned to remove soap scum, hard water scale, mildew and other impurities using an appropriate cleaning product prior to applying the coatable composition to the surface of the substrate. Following the application of the composition to the substrate, the composition is allowed to dry at ambient conditions to form a durable polymeric coating which will slowly release biocide to the surrounding substrate. The drying time required to form the polymeric coating will vary depending on the temperature, humidity and the thickness of the coating of composition applied to the substrate, for example. However, with the foregoing conditions in mind, a drying time of about 4 hours is generally sufficient.

The resulting coated substrate will be resistant to the growth of visible microbe colonies for an extended period of time. Typically, the substrate will not need further treatment with the coatable composition for a period ranging from 1 to about 4 weeks depending on the volume and the frequency of warm water contact. As will be appreciated, the effectiveness of the biocide included within the polymeric coating will gradually decrease over time. Consequently, the polymeric layer can be removed from the substrate periodically and replaced with a new coating of the coatable composition. The polymeric coatings of the invention are easily stripped from the substrate to which they are applied by, for example, the application of a 3% ammonium hydroxide solution (e.g., household ammonia) or a commercially available alkaline cleaner.

EXAMPLES

The following Examples illustrate the preparation, utility and the comparative advantages of the coatable compositions and the resulting polymeric coatings of the invention. The ingredients used and the amounts thereof, as well as the other conditions recited in the Examples, are not to be construed as unduly limiting. Unless otherwise indicated, all parts and percentages are by weight.

ABBREVIATIONS

In the Examples set forth below, the following abbreviations or trade designations are used to identify the components used.

DPME is dipropylene glycol methyl ether available under the trade designation "ARCOSOLV DPM" from ARCO Chemical Company.

TPME is tripropylene glycol methyl ether available under the trade designation "ARCOSOLV TPM" from ARCO Chemical Company.

TBEP is tributoxyethyl phosphate, used as a plasticizer.

DBP is dibutylphthalate.

FC-129 is the trade designation for a coating aid available from the Minnesota Mining and Manufacturing Company, St. Paul, Minn.

SWS-211 is a designation for an antifoaming agent available from Stauffer-Walker Silicone Corp. of Adrian, Mich.

Kathon CG/ICP is a trade designation for a preservative available from Rohm & Haas Company, Philadelphia, Pa.

ESI-CRYL 20/20 is a trade designation for an acrylic polymer emulsion (zinc free) available from Emulsion Systems Inc., Valley Stream, N.Y.

CONLEX V is a trade designation for an acrylate polymer emulsion (zinc free) available from Morton International of Chicago, Ill.

RESIN 5550 is a designation for a carboxylated styrene-butadiene latex polymer emulsion available from Unocal Corp. of Schaumburg, Ill.

Rhoplex NT 2624 is a trade designation for an acrylic polymer emulsion (zinc free) available from Rohm & Haas, Philadelphia, Pa.

MC-28 is a trade designation for a polyacrylate solution polymer leveling agent available from Morton International., Chicago, Ill.

AC-325 is a trade designation for an oxidized polyethylene wax emulsion available from Morton International.

E-43N is a trade designation for an oxidized polyethylene wax emulsion available from Morton International.

WAX 392-N35 is a designation for an oxidized polyethylene wax emulsion available from Van Waters & Rogers Inc., a subsidiary of Univar, Kirkland, Va.

WAX 02125 is a designation for an oxidized polyethylene wax emulsion available from Michelman, Inc. of Cincinnati, Ohio.

DURAPLUS 1 is an acrylate polymer emulsion containing styrene and a zinc complex available from Rohm & Haas, Philadelphia, Pa.

A-1110 is the trade designation for 3-Aminopropyl Trimethoxysilane available from OSi Specialties, Inc. of Danbury, Conn.

DI $H_2O$ is deionized water.

Tile is ceramic tile squares measuring 3 in.×3 in. (7.6 cm×7.6 cm) used as a substrate in the comparative testing below.

Sheetrock is circular sections of conventional sheetrock used as a substrate in the comparative testing below.

Grout is tile grout available from Savogran Co. of Norwood, Mass. made into circular substrates of 8 cm diameter and about 0.25 cm thickness used as a substrate in the comparative testing below.

PREPARATION OF SUBSTRATES

In the comparative testing described below, the tile, sheetrock and grout were prepared as follows.

(1) The tile was prepared by first washing the individual tiles with a sponge in a warm water soap solution using a conventional dishwashing detergent ("Dawn" from the Proctor & Gamble Company). The washed tiles were then rinsed with running tap water and dried at ambient conditions for a minimum of 2 hours. Following drying, some of the tiles were coated with the compositions of the Examples or of the Comparative Examples, as needed. The compositions were applied to the tile by spraying the composition onto a surface of the tile from a conventional trigger spray bottle, followed by wiping with a cloth or paper towel to leave a thin uniform wet film on the surface of the substrate. The thus treated tiles were allowed to dry at ambient conditions for a minimum of four hours.

(2) Grout was prepared from ready to use grout paste obtained from Savogran Co. of Norwood, Mass. The paste was transferred to a petri dish (8 cm in diameter and 0.95 cm deep) and spread about the inside of the dish to provide a smooth surface. The paste was then dried overnight at ambient conditions. The resulting dried grout was left in the dish and had a thickness of about 0.25 cm. Some of the grout samples were treated with the coatable compositions of the Examples as well as the compositions of the Comparative Examples. In treating the surfaces of the grout, the compositions were applied as a light layer dispensed from a trigger spray bottle by adjusting the spray bottle to dispense a fine mist. The substrates were allowed to dry for a minimum of four hours at ambient conditions.

(3) A sheet of conventional sheetrock having a thickness of 1.3 cm (0.5 inch) was brush coated with a white, flat latex wall paint (No. 3225 from Glidden Company, Cleveland, Ohio) and allowed to dry at ambient conditions for at least four hours. Circular discs 8.9 cm (3.5 inches) in diameter were cut from the painted sheetrock, and the discs were then treated with coatable composition in the same manner as the grout.

TEST METHODS

The following test methods were employed in the comparative testing set forth below.

FUNGAL CHALLENGE

The mildew resistance of polymeric coatings on the above described treated substrates was measured using a modification of ASTM Test Method G21-90. The test followed the ASTM method using five organisms: *Aspergillus niger* (ATCC 9642), *Penicillium pinophiluum* (ATCC 11797), *Chaetomium globosum* (ATCC 6205), *Gliocladium virens* (ATCC 9645), and *Aureobasidium pullulans* (ATCC 15233) which were made into a suspension using Czapek's solution instead of the nutrient salts broth called for in Method G21-90. Surfaces of the tested substrates were uniformly moistened with the fungus suspension by spraying for 5–10 seconds at 16 psi ($5.46 \times 10^{-4}$ $kg/m^2$) using a glass nebulizer. The thus treated substrates were then incubated at 28° C. and 95% relative humidity for a minimum of 28 days. During the 28 day incubation period, the samples were rated for microbial growth at 7, 14, 21 and 28 days according to the following rating system:

0=No growth 0.1=0–10% (colonies discrete or growth mostly along bottom edge)

0.5=10–30% sterile coverage (no spores)

1.0=30–60% sterile coverage or 10–30% coverage with moderate sporulation 1.5=>60% light sterile coverage 2.0=100% dense sterile coverage or 30–60% coverage with moderate sporulation 2.5=100% coverage with traces of sporulation (not visible with naked eye)

3.0=100% coverage with light sporulation (visible with naked eye)

3.5=100% coverage with moderate sporulation (sample still visible)

4.0=100% coverage with heavy sporulation (sample barely visible).

The data for the Fungal Challenge are reported below in Table 5.

DURABILITY

The durability of polymeric coatings on ceramic tiles which had been cleaned and treated in the manner described above under "Substrate Preparation" except that each of the coatable compositions applied to the tiles included 2% FD&C Blue #1 in water at a concentration of about five drops per 100 grams of coatable composition. Sets of five tiles each were treated with each of the coatable compositions employed. Four tiles from each of the sets were washed individually for one, three, five, and eight hours, respectively, under a continuous stream of warm water at 38° C. (100° F.) in a laboratory shower stall. The remaining tile from each set was set aside for use as a standard in to compare with the washed tiles. Durability was evaluated by a visual comparison of the color intensities of the washed tiles and the unwashed tile from each of the sets with the more intense colors indicating greater durability for the composition applied to the tile.

PREPARATIVE PROCEDURES

ACRYLATE POLYMER EMULSIONS A AND B

Acrylate polymer compositions were prepared by adding all components in the order listed in Tables 1 and 2 below, allowing between 5 and 10 minutes mixing time between additions of the individual components. The resulting compositions were about 18% solids. The emulsions were used in the formulation of the inventive Examples and in the preparation of the Comparative Examples.

TABLE 1

(Emulsion A)

| Component | Weight % |
|---|---|
| DI H$_2$O | 54.67 |
| FC-129 | 0.015 |
| SWS-211 | 0.025 |
| Kathon CG/ICP | 0.033 |
| DPME | 3.65 |
| TPME | 0.65 |
| TBEP | 1.260 |
| CONLEX V | 21.50 |
| RESIN 5550 | 2.60 |
| WAX 02125 | 3.40 |
| WAX 392-N35 | 2.60 |
| DURAPLUS 1 | 9.600 |

TABLE 2

(Emulsion B)

| Component | Weight % |
|---|---|
| DI H$_2$O | 42.76 |
| DPME | 5.00 |
| TBEP | 2.36 |
| DBP | 0.80 |
| FC-129 | 0.02 |
| SWS-211 | 0.03 |
| Kathon GC/ICP | 0.03 |
| ESI-CRYL 20/20 | 20.00 |
| Rhoplex NT 2624 | 20.00 |
| MC-28 | 2.50 |
| AC-325 | 3.50 |
| E-43N | 3.00 |

EXAMPLES 1–5

Inventive biocidal coating compositions 1 to 5 were prepared by combining ingredients at the weights (in grams) and in the order listed in Table 3.

TABLE 3

(Examples 1–5)

| Component[1] | Example 1 | Example 2 | Example 3 | Example 4 | Example 5 |
|---|---|---|---|---|---|
| Water | 50 | 50 | 50 | 50 | 50 |
| A-1110 | 0.6 | 0.6 | 0.6 | 0.6 | 0.6 |
| Emulsion A | 50 | 50 | — | — | 50 |
| Emulsion B | — | — | 50 | 50 | — |
| 3-iodo-2-propynyl butylcarbamate | 2 | — | 2 | — | — |
| Diiodo methyl-p-tolyl-sulfone | — | — | — | — | 2 |
| 2-(4-thiazolyl) benzimidazole | — | 1 | — | 1 | — |

[1]The weights of the components are given in the Table in grams.

COMPARATIVE EXAMPLES A–D

Comparative Examples A–D were prepared using the acrylate Emulsions A or B. Comparative Examples A and B were prepared without biocide while both Comparative Examples C and D were prepared with 1 gram of 2-(4-thiazolyl) benzimidazole as the biocide. The weights (in grams) of the components used in the preparation of the Comparative Examples are set forth in Table 4.

TABLE 4

(Comparative Examples A–D)

| Component | A | B | C | D |
|---|---|---|---|---|
| Water | 50 | 50 | 50 | 50 |
| A-1110 | — | — | — | — |

TABLE 4-continued (Comparative Examples A–D)

| Component | A | B | C | D |
|---|---|---|---|---|
| Emulsion A | 50 | — | 50 | — |
| Emulsion B | — | 50 | — | 50 |
| 2-(4-thiazolyl)benzimidazole | — | — | 1 | 1 |

COMPARATIVE TESTING

Fungal Challenge

The compositions of Examples 1, 2 and 4 and the emulsions of Comparatives A, B, C and D were applied to tile, grout, and sheetrock substrate in the manner indicated in the above Preparation Of Substrates description. Untreated substrates were also used in this test, as indicated in the data. Prior to testing, some of the tile was washed for periods of up to 8 hours under a continuous stream of warm water at 38° C. (100° F.) in a laboratory shower stall. Likewise, some of the grout was washed under identical conditions for up to 5 hours. The sheetrock was not washed. The thus treated substrates were evaluated for mildew resistance according to the Fungal Challenge Test, described above. The comparative data and the experimental conditions are set forth in Table 5.

TABLE 5

(Fungal Challenge)

| Substrate | Coating | No. Hours Washed | Rating Day 7 | Day 14 | Day 21 | Day 28 |
|---|---|---|---|---|---|---|
| Tile | none | — | 2.5 to 3.5 | 2.5 to 3.5 | 2.5 to 3.5 | 2.5 to 3.5 |
| Tile | none | 1 | 2.5 to 3.5 | 2.5 to 3.5 | 2.5 to 3.5 | 2.5 to 3.5 |
| Tile | none | 3 | 2.5 to 3.5 | 2.5 to 3.5 | 2.5 to 3.5 | 2.5 to 3.5 |
| Tile | none | 5 | 2.5 to 3.5 | 2.5 to 3.5 | 2.5 to 3.5 | 2.5 to 3.5 |
| Tile | none | 8 | 2.5 to 3.5 | 2.5 to 3.5 | 2.5 to 3.5 | 2.5 to 3.5 |
| Tile | Example 2 | — | 0–0.1 | 0–0.1 | 0–0.1 | 0–0.1 |
| Tile | Example 2 | 1 | 0–0.1 | 0–0.1 | 0–0.1 | 0–0.1 |
| Tile | Example 2 | 3 | 0–0.1 | 0–0.1 | 0–0.1 | 0–0.1 |
| Tile | Example 2 | 5 | 0.1–0.5 | 0.1–0.5 | 0.1–0.5 | 0.1–0.5 |
| Tile | Example 2 | 8 | 0.5 | 0.5 | 0.5 | 0.5 |
| Tile | Example 4 | — | 0 | 0 | 0–0.1 | 0–0.1 |
| Tile | Example 4 | 1 | 0–0.1 | 0–0.1 | 0–0.1 | 0–0.1 |
| Tile | Example 4 | 3 | 0–0.1 | 0–0.1 | 0–0.1 | 0–0.1 |
| Tile | Example 4 | 5 | 0.1–0.5 | 0.1–0.5 | 0.1–0.5 | 0.1–0.5 |
| Tile | Example 4 | 8 | 0.5 | 0.5 | 0.5 | 0.5 |
| Tile | C. Ex. A | — | 2.5 to 3.5 | 2.5 to 3.5 | 2.5 to 3.5 | 2.5 to 3.5 |
| Tile | C. Ex. A | 1 | 2.5 to 3.5 | 2.5 to 3.5 | 2.5 to 3.5 | 2.5 to 3.5 |
| Tile | C. Ex. A | 3 | 2.5 to 3.5 | 2.5 to 3.5 | 2.5 to 3.5 | 2.5 to 3.5 |
| Tile | C. Ex. A | 5 | 2.5 to 3.5 | 2.5 to 3.5 | 2.5 to 3.5 | 2.5 to 3.5 |
| Tile | C. Ex. A | 8 | 2.5 to 3.5 | 2.5 to 3.5 | 2.5 to 3.5 | 2.5 to 3.5 |
| Tile | C. Ex. B | — | 2.5 to 3.5 | 2.5 to 3.5 | 2.5 to 3.5 | 2.5 to 3.5 |
| Tile | C. Ex. B | 1 | 2.5 to 3.5 | 2.5 to 3.5 | 2.5 to 3.5 | 2.5 to 3.5 |
| Tile | C. Ex. B | 3 | 2.5 to 3.5 | 2.5 to 3.5 | 2.5 to 3.5 | 2.5 to 3.5 |
| Tile | C. Ex. B | 5 | 2.5 to 3.5 | 2.5 to 3.5 | 2.5 to 3.5 | 2.5 to 3.5 |
| Tile | C. Ex. B | 8 | 2.5 to 3.5 | 2.5 to 3.5 | 2.5 to 3.5 | 2.5 to 3.5 |
| Tile | C. Ex. C | — | 2.5 to 3.5 | 2.5 to 3.5 | 2.5 to 3.5 | 2.5 to 3.5 |
| Tile | C. Ex. C | 1 | 2.5 to 3.5 | 2.5 to 3.5 | 2.5 to 3.5 | 2.5 to 3.5 |
| Tile | C. Ex. C | 3 | 2.5 to 3.5 | 2.5 to 3.5 | 2.5 to 3.5 | 2.5 to 3.5 |
| Tile | C. Ex. C | 5 | 2.5 to 3.5 | 2.5 to 3.5 | 2.5 to 3.5 | 2.5 to 3.5 |
| Tile | C. Ex. C | 8 | 2.5 to 3.5 | 2.5 to 3.5 | 2.5 to 3.5 | 2.5 to 3.5 |
| Tile | C. Ex. D | — | 2.5 to 3.5 | 2.5 to 3.5 | 2.5 to 3.5 | 2.5 to 3.5 |
| Tile | C. Ex. D | 1 | 2.5 to 3.5 | 2.5 to 3.5 | 2.5 to 3.5 | 2.5 to 3.5 |
| Tile | C. Ex. D | 3 | 2.5 to 3.5 | 2.5 to 3.5 | 2.5 to 3.5 | 2.5 to 3.5 |
| Tile | C. Ex. D | 5 | 2.5 to 3.5 | 2.5 to 3.5 | 2.5 to 3.5 | 2.5 to 3.5 |
| Tile | C. Ex. D | 8 | 2.5 to 3.5 | 2.5 to 3.5 | 2.5 to 3.5 | 2.5 to 3.5 |
| Sheetrock | none | — | 4 | 4 | 4 | 4 |
| Sheetrock | Example 1 | — | 0 | 0 | 0 | 0 |
| Grout | none | — | 1.0 | 1.0 | 2.0 | 2.0 |
| Grout | none | 5 | 2.0 | 2.0 | 2.0 | 2.5 |
| Grout | Example 1 | — | 0 | 0 | 0 | 0 |
| Grout | Example 1 | 5 | 0 | 0 | 0 | 0 |

The Fungal Challenge data establishes the superior antimicrobial action of the polymeric coatings of the invention as reflected in the data set forth in Table 5. The compositions of the invention provided excellent antimicrobial protection for a period of 28 days after application to the various substrates tested, and the performance of these coating was unaffected by the continuous washing of the treated substrates for periods of up to 8 hours.

COMPARATIVE TESTING

Durability

Tiles coated with the compositions of Examples 1–4 and Comparatives A–D were prepared and evaluated for durability according to the procedure set forth above. The tiles coated with the inventive compositions of Examples 1–4 showed only a slight decrease in color intensity when observed visually after the treated substrates were washed for up to 8 hours. The tiles coated with the compositions of the Comparative Examples showed no observable color after washing, indicating that the compositions had been completely washed from the surfaces of the substrates by the warm water washing. The results of the durability test indicate that the polymeric coatings of the invention adhere well to the tile surface even after prolonged contact with the warm water. The tiles treated with the compositions of the Comparative Examples, on the other hand, showed poor adhesion to a tile surface.

Although details of the preferred embodiment of the invention have been discussed and described in some detail, those skilled in the art will appreciate that various changes and modifications can be made to the described embodiment without departing from the true spirit and scope of the invention, as defined in the following claims.

We claim:

1. A coatable composition suitable for application to a substrate to prevent the growth of microbes thereon, the composition comprising:

an acrylate emulsion polymer comprising the reaction product of one or more acrylate or methacrylate monomers and one or more carboxylic acid monomers, said acrylate emulsion polymer including a plurality of reactive carboxyl groups, said acrylate emulsion polymer present in the coatable composition at a concentration within the range from about 3 to about 25% by weight;

an organoalkoxysilane of the general formula
   $(A)N(R_4)(R_5)$
   wherein
   A is $[(OR_1)Si(R_2)(R_3)C_nH_{2n-1}]$,
   n is an integer from 1 to 6,
   $R_1$ can be H or $C_1$–$C_6$ alkyl (straight, branched or cyclic),
   $R_2$ and $R_3$ independently are —OH, $OR_1$, or $C_1$–$C_6$ alkyl (straight, branched or cyclic),
   $R_4$ and $R_5$ independently are A, H, $C_1$–$C_6$ alkyl (straight, branched or cyclic), and $C_1$–$C_6$ aminoalkyl (straight, branched or cyclic),
   said organoalkoxysilane present in the coatable composition at a concentration within the range from about 0.25 to about 3% by weight;

biocide in an amount effective to prevent the growth of visible mildew colonies when the coatable composition is applied to a substrate; and balance water.

2. The composition of claim 1 wherein said acrylate or methacrylate monomers are selected from the group consisting of alkyl acrylates and methacrylates of $C_1$ to $C_6$ saturated straight and branched alkyl moieties.

3. The composition of claim 1 wherein said carboxylic acid monomers are selected from the group consisting of acrylic, methacrylic, butenoic, maleic, fumaric, itaconic, cinnamic acids and combinations of the foregoing.

4. The composition of claim 1 wherein the acrylate polymer further comprises a metal salt complexing agent selected from the group consisting of ammonium zinc carbonate, ammonium calcium ethylenediamine carbonate, ammonium zinc acetate, ammonium zinc acrylate, ammonium zinc maleate, ammonium zinc amino acetate and ammonium calcium aniline and combinations thereof.

5. The composition of claim 1 wherein said acrylate emulsion polymer further comprises an effective amount of cosolvent selected from the group consisting of $C_1$ to $C_4$ monoalkyl ethers of mono-, di- and tri- ethylene glycol ethers, propylene glycol ethers, and combinations of the foregoing.

6. The composition of claim 1 wherein $R_1$ is $CH_3$ or $C_2H_5$, $R_2$ and $R_3$ are $OR_1$, and $R_4$ and $R_5$ are H, $CH_3$ or $C_2H_5$.

7. The composition of claim 1 wherein said silane is selected from the group consisting of gamma-aminopropyltriethoxysilane, gamma-aminopropyltrimethoxysilane, N-beta-(Aminoethyl)-gamma-aminopropyltrimethoxysilane, triaminofunctional silane, and bis-(gamma-trimethoxysilylpropyl) amine and combinations of the foregoing.

8. The composition of claim 1 wherein said biocide is selected from the group consisting of sulfones and thiocyanates; isothiazolones; phenols and substituted phenols; diazines; triazines, organotin compounds; 2,2-dibromo-3-nitrilopropionamide and iodobenzanilide; thiocarbamates, benzimidazolyl carbamates and dithiocarbamates; dimethylhydantoins; organohalogens; dichlorophenyl trichloroethanol; organophosphates; difluoro benzoyl chlorophenylurea; pyrethrinoids; quinones; dicarboximides; dodecyl guanidine acetate; triazoles; thiadiazoles; metallic monoethyl phosphates; haloalkynyl alkylcarbamates; haloisothiolnitride; 2-pyridinethiol 1-oxide and salts thereof; and combinations of any of the foregoing compounds.

9. The composition of claim 1 wherein said biocide is selected from the group consisting of 3-iodo-2-propynyl butylcarbamate, 2-(4-thiazolyl) benzimidazole, diiodomethyl-p-tolylsulfone, tetrachloroisophthalonitrile, the zinc complex of 2-pyridinethiol-1-oxide and salts thereof, and combinations of the foregoing.

10. An adherent durable polymeric coating derived from the coatable composition of claim 1.

11. An adherent, durable, alkaline sensitive coating capable which when applied over a substrate will provide protection from the growth of microbes over an extended period of time, the coating comprising:

the reaction product of an acrylate emulsion polymer and an organoalkoxysilane, said acrylate emulsion polymer including a plurality of reactive carboxyl groups and comprising the reaction product of one or more acrylate or methacrylate monomers and one or more carboxylic acid monomers, said organoalkoxysilane represented by the general formula
   $(A)N(R_4)R_5)$
   wherein
   A is $[(OR_1)Si(R_2)(R_3)C_nH_{2n-1}]$,
   n is an integer from 1 to 6,
   $R_1$ can be H or $C_1$–$C_6$ alkyl (straight, branched or cyclic),
   $R_2$ and $R_3$ independently are —OH, $OR_1$, or $C_1$–$C_6$ alkyl (straight, branched or cyclic),
   $R_4$ and $R_5$ independently are A, H, $C_1$–$C_6$ alkyl (straight, branched or cyclic), and $C_1$–$C_6$ aminoalkyl (straight, branched or cyclic); and biocide in an amount effective to prevent the growth of visible mildew colonies;

wherein the coating is removable from the substrate by the application of alkaline thereto.

12. The coating of claim 11 wherein said acrylate or methacrylate monomers are selected from the group consisting of alkyl acrylates and methacrylates of $C_1$ to $C_6$ saturated straight and branched alkyl moieties.

13. The coating of claim 11 wherein said carboxylic acid monomers are selected from the group consisting of acrylic, methacrylic, butenoic, maleic, fumaric, itaconic, cinnamic acids and combinations of the foregoing.

14. The coming of claim 11 wherein the acrylate polymer further comprises a metal salt complexing agent selected from the group consisting of ammonium zinc carbonate, ammonium calcium ethylenediamine carbonate, ammonium zinc acetate, ammonium zinc acrylate, ammonium zinc maleate, ammonium zinc amino acetate and ammonium calcium aniline and combinations thereof.

15. The coating of claim 11 wherein said acrylate emulsion polymer further comprises an effective amount of cosolvent selected from the group consisting of $C_1$ to $C_4$ monoalkyl ethers of mono-, di- and tri- ethylene glycol ethers, propylene glycol ethers, and combinations of the foregoing.

16. The coating of claim 11 wherein $R_1$ is $CH_3$ or $C_2H_5$, $R_2$ and $R_3$ are $OR_1$, and $R_4$ and $R_5$ are H, $CH_3$ or $C_2H_5$.

17. The coating of claim 11 wherein said silane is selected from the group consisting of gamma-aminopropyltriethoxysilane, gamma-aminopropyltrimethoxysilane, N-beta-(Aminoethyl)-gamma-aminopropyltrimethoxysilane, tri-aminofunctional silane, and bis-(gamma-trimethoxysilylpropyl) amine and combinations of the foregoing.

18. The coating of claim 11 wherein said biocide is selected from the group consisting of sulfones and thiocyanates; isothiazolones; phenols and substituted phenols; diazines; triazines, organotin compounds; 2,2-dibromo-3-nitrilopropionamide and iodobenzanilide; thiocarbamates, benzimidazolyl carbamates and dithiocarbamates; dimethylhydantoins; organohalogens; dichlorophenyl trichloroethanol; organophosphates; difluoro benzoyl chlorophenylurea; pyrethrinoids; quinones; dicarboximides; dodecyl guanidine acetate; triazoles; thiadiazoles; metallic monoethyl phosphates; haloalkynyl alkylcarbamates; haloisothiolnitride; 2-pyridinethiol 1-oxide and salts thereof; and combinations of any of the foregoing compounds.

19. The composition of claim 11 wherein said biocide is selected from the group consisting of 3-iodo-2-propynyl butylcarbamate, 2-(4-thiazolyl) benzimidazole, diiodomethyl-p-tolylsulfone, tetrachloroisophthalonitrile, the zinc complex of 2-pyridinethiol-1-oxide and salts thereof, and combinations of the foregoing.

* * * * *